United States Patent [19]

Hotger

[11] 4,302,019
[45] Nov. 24, 1981

[54] LABYRINTHINE MECHANICAL SEAL

[75] Inventor: Karl Hotger, Bochum, Fed. Rep. of Germany

[73] Assignee: Eickhoff Maschinenfabrik und Eisengiesserei m.b.H, Bochum, Fed. Rep. of Germany

[21] Appl. No.: 118,831

[22] Filed: Feb. 5, 1980

[30] Foreign Application Priority Data

Feb. 8, 1979 [DE] Fed. Rep. of Germany ....... 2904739

[51] Int. Cl.³ .......................... F16J 15/16; F16J 15/44
[52] U.S. Cl. ........................................ 277/56; 277/59; 277/DIG. 8
[58] Field of Search .................................... 277/53–56, 277/DIG. 8, 96.2, 59

[56] References Cited

U.S. PATENT DOCUMENTS

| 1,925,898 | 9/1933 | Fritz | 277/56 |
| 2,270,927 | 1/1942 | Browne | 277/DIG. 8 |
| 2,554,488 | 5/1951 | Carr | 277/96.2 |
| 3,477,385 | 11/1969 | Tangerman et al. | 277/59 |

FOREIGN PATENT DOCUMENTS 726457  1/1966  Canada .......................... 277/DIG. 8

Primary Examiner—Robert I. Smith
Attorney, Agent, or Firm—Thomas H. Murray; Clifford A. Poff

[57] ABSTRACT

A labyrinthine mechanical seal in a bore of a casing for a rotatable shaft which is substantially free of axial forces and mounted for axial movement while carried by bearings in the casing. The seal includes a first group of discs arranged in an axial spaced-apart relation on the rotatable shaft and a second group of discs arranged in a non-rotatable manner at axial spaced-apart locations in the bore of the casing to extend around the shaft and mesh with the first group of discs in a manner of a labyrinth. The axial clearances between the groups of discs is 0.2 millimeter or less and the radial clearance between the groups of discs is only slightly greater than the radial clearance in the bearings. The discs are resilient and consist of hardened steel. Alternatively, the discs of one of the groups consist of hardened steel and the other consists of bronze. If desired, according to a further embodiment, the discs comprising both groups each has an annular groove extending in the side face over substantially half the radial height of the meshing disc portions.

6 Claims, 3 Drawing Figures

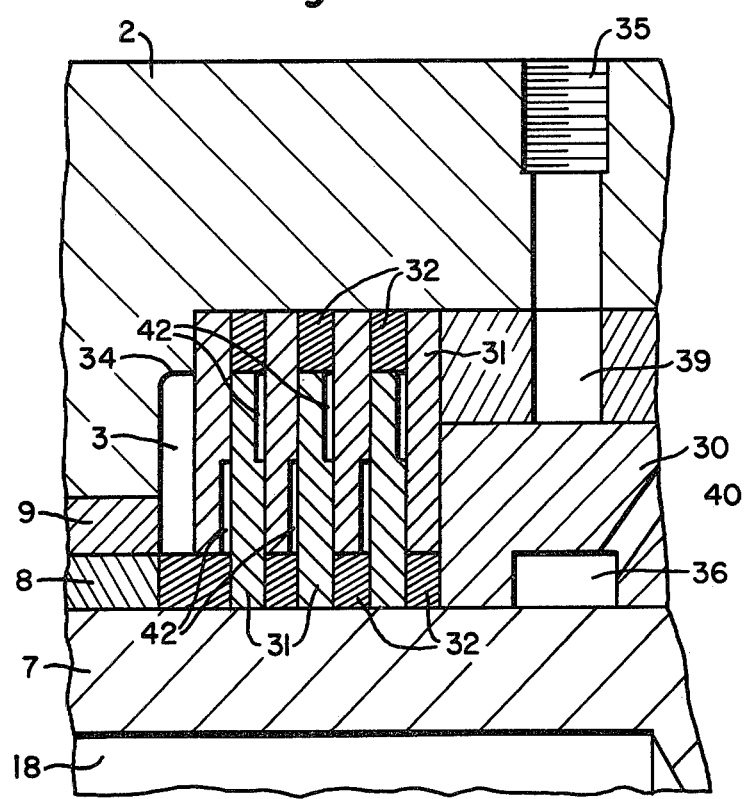

LABYRINTHINE MECHANICAL SEAL

BACKGROUND OF THE INVENTION

This invention relates to a mechanical seal for a rotatable shaft which is substantially free of forces in an axial direction of the shaft, and more particularly to such a mechanical seal located in a mechanically-live bore or bushing or the like wherein the seal includes two groups of discs arranged in axial spaced-apart and generally face-to-face relationships to mesh with one another in the manner of a labyrinth, one group of discs is disposed on the rotatable shaft; while the other group of discs is disposed in a nonrotatable manner in a bore of a bushing extending centrally around the shaft.

A labyrinthine seal for a rotatable shaft is generally well known in the art. Such a seal is constructed in a manner generally similar to the mechanical seal described hereinbefore and is classified in the category of a contactless seal.

West German Pat. No. 2,647,016 discloses a sliding ring-type seal disposed in a casing wherein a relatively low average flow of a pressurized medium acts on one side of the seal and a relatively high average flow of a pressurized medium acts on the other side. The sliding ring seal extends around a shaft that rotates in the bore of a casing. This kind of seal comprises relative rotatable sliding rings or slip rings, that is, one ring is secured to the casing and another ring is secured to the shaft. The two rings have contacting seal surfaces, one of which is larger than the other. The larger seal surface is acted upon by the average flow pressure of the medium in a non-contacting region. A pressure difference of the medium is produced by the flow of the medium which distorts the larger surface of the ring and permits a leakage flow of the medium between the contacting surfaces.

SUMMARY OF THE INVENTION

It is an object of the present invention to provide a mechanical seal which is particularly suitable for rotatable shafts, and more particularly for a shaft in a live mechanical bore, bushing or the like.

The present invention improves upon the known type of mechanical seal of the type hereinbefore described for a rotatable shaft by providing that the shaft is mounted for axial movement but that axial mobility of the shaft is limited only by two groups of discs. The axial clearance between the two groups of discs is less than 0.2 millimeter. The radial clearance for the two groups of discs is only slightly greater than the radial clearance of the bearings for the shaft.

More specifically, the present invention provides a labyrinthine mechanical seal in a bore of a casing such as a bushing or the like for a rotatable shaft which is substantially free of an axial force and mounted for axial movement in a casing while carried by bearing means, the combination therewith wherein the seal includes a first group of discs arranged in an axial spaced-apart relation on the rotatable shaft, and a second group of discs arranged in a non-rotatable manner at axial spaced-apart locations in the bore of the casing to extend around the shaft and mesh with the first group of discs in the manner of a labyrinth, the first and second groups of discs having an axial clearance of 0.2 millimeter or less with the radial clearance for the groups of discs being only slightly greater than the radial clearance in the bearing means.

The gaps between the discrete discs of such a seal are so narrow that any leakage of fluid occurs at a reduced flow rate. The fluid pressure of the leakage fluid decreases between consecutive discs because of the labyrinthine construction of the seal and minimizes fluid loss by restriction or throttling. Consequently, the pressure of fluid operating on the front of the disc must be greater than the pressure of the fluid acting on the back of the disc. The fluid pressure difference acting on the discs tends to shift the discs and the shaft in an axial direction to the extent permitted by the clearance between the discs. The discs of the two groups are pressed against one another under a force directed in an axial direction. The clearance in the seal is at a minimum between contacting surface portions which bring about a considerable increase to the restrictive effect on the flow of fluid at the opposite side of the disc where the seal clearance is maximum, but the velocity of the leakage fluid is considerably reduced. Moreover, a greater load is imposed on the outer edge region of a disc since the pressure difference between the two faces of a disc is maximum in its outer peripheral zone because the area of a disc increases according to a square-law relationship with an increase in radius. The various discs of one group tend to bear mainly at their outermost peripheral edge on an adjacent disc of the other group and vice versa. The gap between the discs is, therefore, minimal in this outer peripheral region and increases radially inwardly or outwardly therefrom.

Conveniently, the discs are resilient and comprised of hardened steel. The discs can be manufactured by, for example, face-grinding to very close tolerances and sufficiently resilient for their intended purpose. Alternatively, the discs of one group can be made of hardened steel and the discs of the other group can be made of bronze. By this combination of materials, the rubbing relationship between contacting portions of the discs is very good and friction is reduced.

To improve the resiliency of the various discs, the discs comprising both groups can have machined annular grooves on their faces which are directed toward the chamber to be sealed. The annular grooves extend to about the maximum diameter of the face of a disc and substantially over half of the height or radial distance of the meshing portions of the discs. This machining reduces the width of the discs near the bores therein for one group of discs and near the outer periphery of the discs forming the other group. The machining also increases resiliency of the discrete discs in an axial direction and, therefore, increases their response to increased loading at the outer peripheral zone where they bear on or contact one another so that a very narrow gap is left.

In mechanically-live bushings with mechanical seals where a rotating shaft is formed with a central or axial bore communicating with one radial discharge bore extending between two labyrinthine seals, it is convenient to reduce the axial forces on the shaft by providing that the axial bore is closed on both end faces and communicates, in a zone outside the two seals, with at least one radial bore for supplying pressurized fluid.

These features and advantages of the present invention as well as others will be more fully understood when the following description of two embodiments of the invention is read in light of the accompanying drawings, in which:

FIG. 3 is a partial longitudinal sectional view similar to the view shown in FIG. 1 but illustrating a second embodiment of a labyrinthine mechanical seal.

Figure 1:
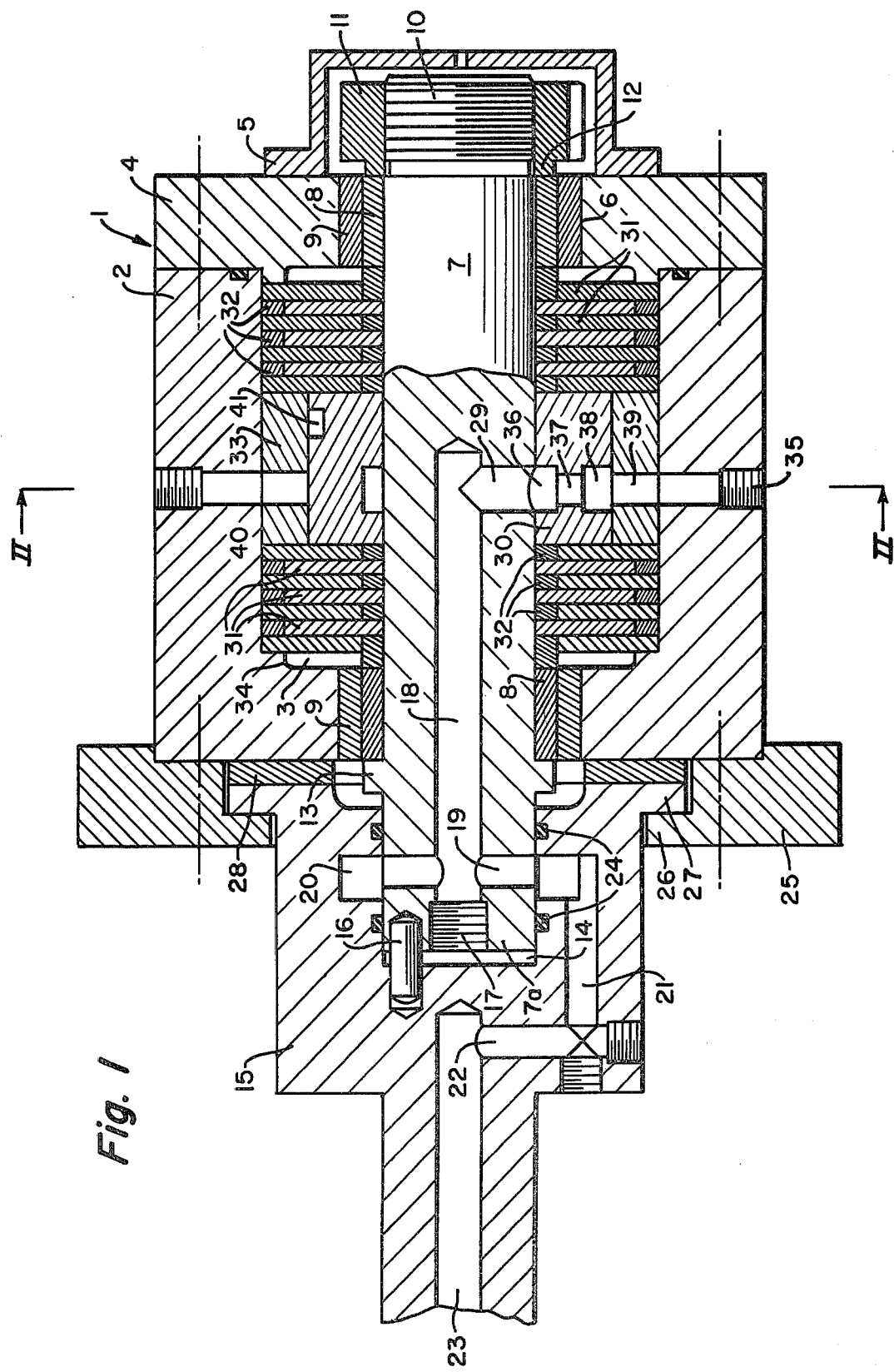
FIG. 1 is a longitudinal section through a mechanically-live bore or bushing and incorporating the labyrinthine mechanical seal according to one embodiment of the present invention.

A mechanically-live bore, bushing or the like is identified in FIG. 1 by reference numeral 1 and includes a stationary casing or cylinder 2 having a bore 3. A cover 4 is centered relative to the bore at one end of the cylinder and attached thereto by bolts or other forms of fasteners. A cap 5 encloses a bore 6 in the cover 4. The cap 5 is disposed symmetrically with respect to the rotational axis of cylinder 2 and bore 6. A shaft 7 is mounted in the bore and carries two bushings 8, one disposed near each end of the shaft. The bushings 8 are carried in the bores of bearing bushings 9. One bushing 9 is non-rotatably disposed in the cylindrical bore 3 and the other bushing 9 is non-rotatably disposed in the bore 6 of the cover 4. The end of the shaft 7 extending beyond the exterior of the cylinder 2 as well as cover 4 has a threaded end onto which there is received a nut 11 having a collar section 12 to bear on the outer end face of bushing 8. A collar 13 is formed on the other end of shaft 7 against which the outer end face of the other bushing 8 bears. A portion 7A of the shaft projects beyond collar 13 and engages in a bore 14 of a member 15. A rigid or solid interconnection is formed by a pin 16 in the end face of shaft portion 7A so that it rotates with member 15. An axial bore 18 extending from one end of shaft 7 is closed by a plug 17. The bore 18 communicates by way of radial bores 19 with the peripheral surface of shaft portion 7A. The radial bores 19 extend to a peripheral groove 20 in member 15. The groove 20 communicates by way of orifices 21 and 22 with a central bore 23 in member 15. Pressurized fluid, particularly high pressurized liquid, is supplied to bore 23. Gaskets 24 carried by member 15 on both sides of groove 20 provide a liquid-tight seal for the gap between shaft 7 and bore 14. A cover 25 is attached to the end face of cylinder 2 by bolts or other fasteners. The cover has a flange 26 that engages over a collar 27 that is part of member 15 and maintains the end face of member 15 which is near cylinder 2 engaged with a bearing or rubbing ring 28 under a relatively reduced specific surface pressure.

As described previously, the shaft 7 is rigidly connected to member 15. Fluid, specifically high-pressure liquid, is supplied to the central bore 23 of member 15 and flows therealong where it passes into orifices 22, 21, groove 20 and radial bores or bores 19. From bores 19, the fluid flows to axial bore 18 of the shaft 7. The bore 18 extends over substantially half the length of the shaft 7 to a point where it communicates with a radial bore 29 extending to the periphery of the shaft where it communicates with a distributor ring 30. Disposed alternately on both sides of the ring are discs 31 and spacer rings 32. The spacer rings 32 take up all lateral gaps between the two bushings 8, the ring 30 and the discs 31 on the shaft. On both sides of ring 30 are two groups of discs that interfit with one another in the manner of a comb. One group of discs is rotatably associated with shaft 7 and the other group of discs is supported in cylinder 2. Nut 11 engages, by way of collar 12, with the end face of bushing 8 which is positioned near it on the shaft. The nut is threaded onto the shaft to press against all the discs 31 comprising one group; spacer rings 32 between these discs; and the ring 30 onto the shaft collar 13 to thereby clamp these parts in an axial direction on the shaft 7. A bushing 33 extends around the ring 30. The discs of the other group in cylinder 2 and bushing 33 are pressed in an axial direction by cover 4 against a shoulder 34 extending from bore 3 in cylinder 2. As shown in FIG. 1, each group of discs is made up of two sets located at opposite sides of ring 30 and bushing 33.

The spacer rings 32 which determine the gap between the discs 31 are of substantially the same diameter as the two bushings 8 and the thickness of the spacer rings is slightly greater than the thickness of the discs 31. Consequently, the inner-disc gap is greater than the thickness of each disc. Moreover, on both sides of the disc comprising the other group of discs which engages in the gaps between the group of discs carried on the shaft, there is only a reduced axial clearance of 0.2 millimeter or less. The radial gap between the rings 32 and the discs 31 is very reduced and does not exceed the bearing clearance which exists between the bushings 8 and the associated bushings 9.

Figure 2:
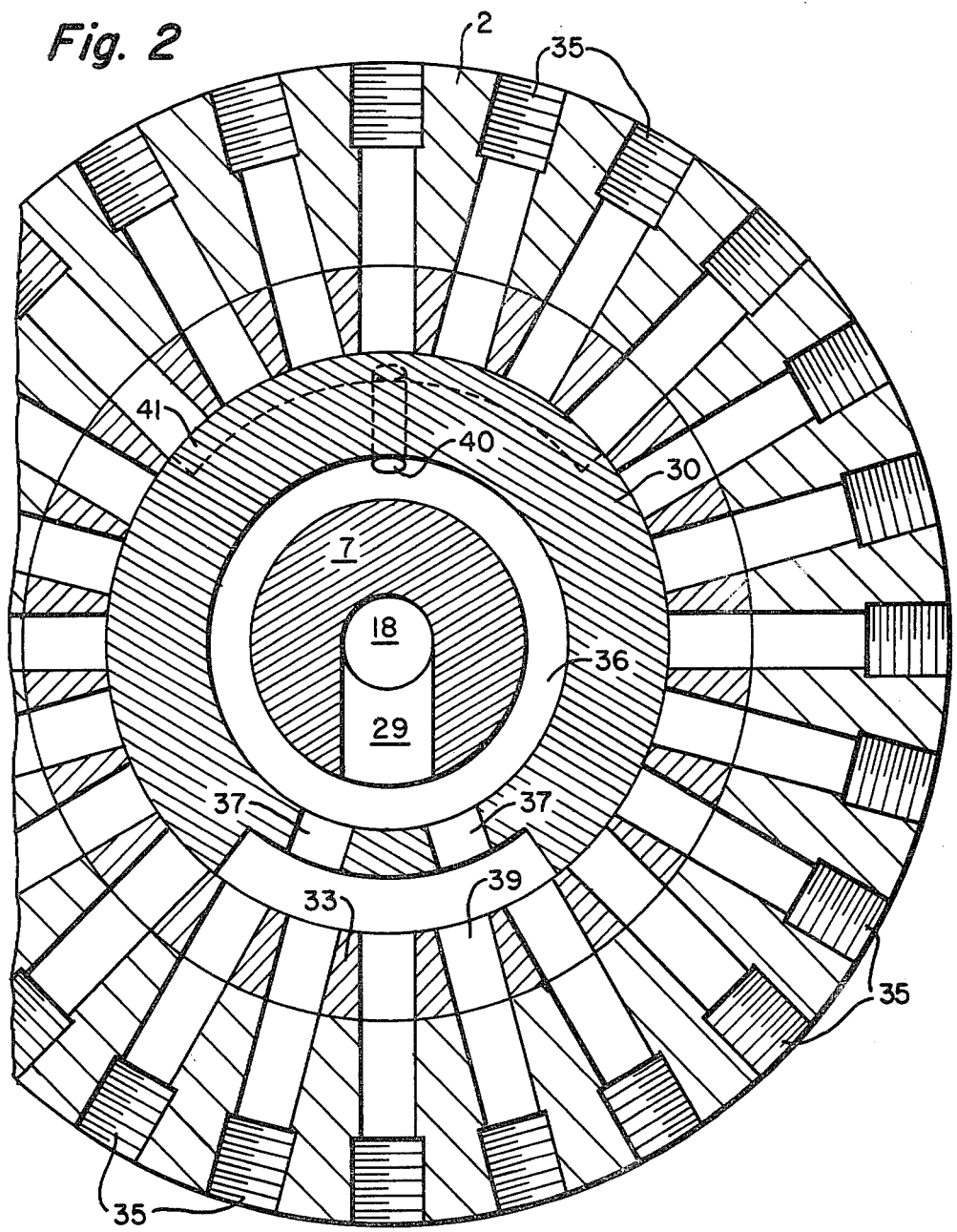
FIG. 2 is a sectional view taken along line II—II of FIG. 1.

As shown in FIGS. 1 and 2, uniformly-spaced radial bores 35 are formed over the entire periphery of cylinder 2 for supplying pressurized liquid to, for example, a drum-cutter mining machine for mineral mining to break up the mineral or suppress dust during the mining operation. The cutter drum corotates with cylinder 2 and is rigidly connected thereto. The flow of liquid from bore 18 in the shaft is directed by the radial bore 29 into the peripheral groove 36 of ring 30 and then by way of one or more radial bores 37 to a recess 38 which extends over only that circumferential angle or part of ring 30 which radial bores of the rotating cutter drum are required to be supplied with liquid under pressure. The arrangement for supplying liquid under pressure to a drum-cutter mining machine of this same general type is shown in U.S. Pat. No. 4,212,497, issued July 15, 1980, assigned to the Assignee of this invention. A recess 41 in bushing 30 is supplied with liquid by way of bore 40 and disposed diametrically opposite recess 38. The recess 41 has a dimension substantially corresponding to the dimensions of recess 38 and serves to produce a pressure cushion which opposes and substantially compensates for the radial pressure in recess 38, thus reducing the load on the shaft bearings 9. Since the bushing 33 is formed with radial bores 29 over its entire peripheral surface, and these bores are positioned similarly to the radial bores 35, the bores 35 in cylinder 2 receive liquid under pressure only when they are passing by recess 38. Consequently, only those radial bores in the cutter drum which register with bores 35 are supplied with liquid under pressure. The bores in the cutter drum are coupled with nozzles on the periphery of the cutter drum. The nozzles are directed at the coal seam that is to be broken up and worked.

The flow of liquid along the bore 18 in shaft 7 occurs without the development of axial forces so that the shaft 7 can assume an axial position such that one or both groups of discs can rotate substantially free of axial forces. As described above, shaft 7 carries discs 31 which do not rotate with the cylinder 2 but extend into the gaps between discs 31 which do rotate with the cylinder 2. Oppositely-directed axial forces come into play only as a result of the pressure of the liquid which may flow between the periphery of the shaft and the bore of ring 30 or between the ring 30 and the bushing 33. Such pressure acts on the two discs 31 adjacent the ring 30 and then on the bushing 33 and then on the following discs 31. Such axial forces cause axial deformation to a relatively considerable extent to those peripheral parts of the discs 31 which are not clamped between the rings 32, thus pressing them against the adjacent discs. The gap between adjacent discs 31 is, therefore, reduced and it becomes more difficult for liquid to flow through and, consequently, the pressure of the liquid decreases between consecutive disc gaps and the two groups of discs. This provides a substantially-tight closure and seal for the mechanically-live bore or the like.

The discs 31 can be made of hardened steel. Alternatively, however, one of the two groups of discs can be made from hardened steel and the other made from bronze. In the latter instance, improved running properties are achieved.

In the embodiment of the invention shown in FIG. 3, the discs 31 of the two groups are each formed with an annular groove 42 in their face or peripheral region which is not clamped between two spacer rings 32. The recesses 42 increase axial resistance, and therefore, increase the sealing action by the discs 31.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. A mechanical seal in the bore of a casing for transferring high-pressure fluid with a rotatable shaft, said casing having at least one opening communicating with the bore thereof for conducting fluid under high pressure, bearing members having radial clearances mounting said shaft substantially free of an axial force to extend within the bore of said casing for axial movement in said casing, said shaft having a central bore extending between radial and spaced-apart fluid openings, the combination therewith of:

a first group of discs arranged in spaced-apart relation along said rotatable shaft, means including spacers between the discs of said first group of discs for clamping the discs to said rotatable shaft, a second group of discs arranged in a non-rotatable manner at spaced-apart locations in the bore of said casing to extend around said shaft and mesh with discs of the first group in the manner of a labyrinth, means including spacers between the discs of said second group for clamping such discs to said casing in the bore thereof, the axial mobility of said shaft being limited only by an 0.2 millimeter or less clearance defined by said spacers between the discs of said first and second groups of discs and the radial clearance between said spacers and discs being only slightly greater than the radial clearance in said bearing means for decreasing the pressure of any fluid between consecutive discs to minimize fluid loss, each of said means having alignable openings to conduct high-pressure fluid between a radial fluid opening of the shaft and the opening in the casing in a direction radially between discs of said first and second groups of discs.

2. The labyrinthine mechanical seal according to claim 1 wherein said discs are resilient and consist of hardened steel.

3. The labyrinthine mechanical seal according to claim 1 wherein the discs comprising one of said first and second groups of discs consist of hardened steel, and the discs comprising the other of said first and second groups of discs consist of bronze.

4. The labyrinthine mechanical seal according to claim 1 wherein the discs comprising said first and second groups of discs each have an annular groove extending in a side face thereof substantially half the radial height of the meshing disc portion.

5. The labyrinthine mechanical seal according to claim 4 wherein the annular groove in a side face of each disc is directed toward a chamber for sealing the casing.

6. The labyrinthine mechanical seal according to claim 1 wherein said rotatable shaft defines part of a bushing having a central bore extending to the radial and spaced-apart fluid opening which extends between two discs comprising said first and second groups of discs, the central bore in said rotatable shaft being closed on both ends of the shaft and communicating in a zone beyond the discs with the remaining one of said spaced-apart fluid openings to supply pressurized liquid.

* * * * *